Patented July 30, 1935

2,009,600

UNITED STATES PATENT OFFICE 2,009,600

COMPOSITION OF MATTER AND METHOD OF MAKING THE SAME

Manuel R. Ximenez, Plainfield, N. J., assignor to Johns-Manville Corporation, New York, N. Y., a corporation of New York No Drawing. Application April 14, 1933, Serial No. 666,175

11 Claims. (Cl. 106—40)

This invention relates to a composition of matter and method of making the same, particularly to a composition including cellulose acetate intimately associated with finely divided diatomaceous earth or similar material.

The invention comprises the novel features hereinafter described or claimed and may be illustrated by reference to cellulose acetate plastics.

A conventional process of manufacturing cellulose acetate includes the following steps. Cellulose of suitable quality is acetylated by being immersed in a mixture of acetic anhydrid, acetic acid, and sulfuric acid. The acetylation is continued for a suitable period of time and at a selected temperature, until the reaction is substantially complete and the original cellulose is converted practically entirely to cellulose acetate, which goes into solution in the acetylating bath which is a solvent for the acetate. The resulting solution is then ripened, to modify the properties of the cellulose acetate, especially to modify the solubility in organic solvents. Thus, the acid solution of acetate may be allowed to stand at a selected temperature until the acetate therein is soluble in acetone. During this ripening a limited proportion of water may be present, possibly to effect very slight hydrolysis of the acetate, with consequent desirable alteration in its properties. After being ripened, the acetate is precipitated, as, for example, by being carefully mixed with a large excess of a liquid non-solvent therefor, such as water or benzol. The non-solvent dilutes the acetic acid present in the acetylation mixture, to such a point that the mixture no longer possesses the property of keeping the acetate dissolved. The result is a precipitation of the acetate in the form of white, fibrous, and relatively hard masses. The precipitated material is then washed on a filter or otherwise to separate the precipitate from the fluid ingredients, including the acid solvent; and the material on the filter is washed with additional water to remove, as far as possible, acetic and sulfuric acids which, if left in the finished product, would affect adversely the stability of the product. The washed product is then dried to remove water therefrom by evaporation and is coarsely ground before use.

In the above manufacture, certain difficulties are encountered. Thus, the precipitated cellulose acetate is in the form of mats, generally in clots, that enclose acid liquor which it is very difficult to remove entirely by subsequent washing of the outside of the particles of precipitate. Furthermore, it is difficult to obtain rapid penetration of such particles, after being dried, by solvents used to colloid the cellulose acetate during its fabrication into useful commercial articles. When it is attempted to grind the dried precipitated masses, it is found that they are difficult to grind finely, so that it is frequently considered desirable to effect such grinding by means of a ball mill. During this grinding in the ball mill, the grinding balls or pebbles are gradually abraded, so that there is introduced into the cellulose acetate an amount of stone dust or the like that may be roughly proportional to the fineness of the grinding produced. Furthermore, any extraneous matter originally present in the cellulose acetate introduced into the ball mill is so effectively comminuted by the action of the mill that it becomes difficult to remove such extraneous matter by the subsequent step of filtering the cellulose acetate, colloided with solvents and plasticizers, through wire screen and linen, under heat and pressure (to which filtration process cellulose acetate is subjected in the manufacture of plastics).

It is an object of the invention to obviate one or more of the above mentioned disadvantages in cellulose acetate products and the method of manufacturing them, and to provide an improved composition containing cellulose acetate and a finely divided material, intimately associated therewith, that is suitably of approximately the same index of refraction as the cellulose acetate plastic and therefore without large effect upon the translucency or color of the acetate, that is light in weight, porous and highly compressible, and that may be used in large proportion, to give a composition particularly adapted for use in making molded or otherwise fabricated articles.

In general, the method of making the improved composition of the present invention comprises the precipitation of cellulose acetate from solution in contact with finely divided diatomaceous earth and removing liquids from the precipitated mixture. This method is illustrated by the following illustrative example:

Cellulose acetate is made in accordance with the conventional process, except that the diatomaceous earth, in finely divided form, is intimately admixed with the acetate at the time of or before the precipitation of the acetate. Thus, the acetate solution is made in conventional manner and subjected to the ripening process. Then there is added to the ripened solution and dispersed or thoroughly stirred thereinto, finely divided diatomaceous earth in the proportion of 40 to 120 parts by weight to 100 parts of actual cellulose acetate. When the mixture has been made intimate, it is treated in accordance with the usual practice for ripened acetate solutions, in that the mixture is caused to flow, in as finely divided stream as feasible, into a large excess of water, with vigorous agitation to cause precipitation of the cellulose acetate. This precipitation occurs when the acetate is in intimate contact with the admixed diatomaceous earth and results in a precipitate in which the two solid materials are intimately associated, the acetate being precipitated in part within and thoroughly impregnated into the pores of the diatomaceous earth particles. It will be noted that the solvent from which the cellulose acetate is precipitated, subsequent to the ripening process, is substantially free from any water-insoluble material that is a solvent for cellulose acetate, such as plasticizer therefor and that, if present, would be precipitated with the cellulose acetate by strong dilution with water, as described.

The precipitate is then separated on a filter from the acid liquor and thoroughly washed with water. Finally, the washed material is freed from water by evaporation, to give a readily crumbled, dry mixture.

Various qualities of finely divided diatomaceous earth may be used, as, for example, diatomaceous earth of purity and fineness of particle adapted for use as a filter-aid, and, preferably, diatomaceous earth that has been calcined in finely divided form in the presence of a chemical adapted to flux clay present in commercial grades of diatomaceous earth, the calcination being effected substantially as described in U. S. Patent 1,502,547, issued to Calvert, Dern, and Alles, on July 22, 1924. It is to be presumed that, in this calcination, the flux and silica of diatomaceous earth react to form a fusible silicate which is an integral part of the surface portions of the resulting sintered particles. Material so made may be subjected to a mild milling or disintegrating action, subsequent to the calcination, and may be air-separated to remove particles of grit and produce a diatomaceous earth product the particles of which are of such size that practically all of them, say, 97% or more by weight, are adapted to be passed through a 150-mesh screen, in the wet screening test which is standard for testing the sizes of particles of diatomaceous earth. Also, there may be used diatomaceous earth made as described but further separated by means of an air stream and cyclonic classification to give a finished material the particles of which are of such size that at least one-half by weight of them are smaller than approximately 4 microns and, suitably, not larger than 2 microns, as measured by the Oden sedimentation test.

When the porosity and other unique functions served by diatomaceous earth particles are not required, a filler of very finely ground crystalline silica or talc may be substituted for the diatomaceous earth present at the time the acetate is precipitated. The diatomaceous earth, however, is particularly suitable for the purposes of the present invention because of the features given and also of lightness, bulk, and inertness, both chemically and physically.

As a modification of the general method given above, the diatomaceous earth which is to be present at the time of the precipitation of the cellulose acetate may be originally admixed with the water to which the solution of cellulose acetate is added to effect the precipitation.

When it is desired to make a plastic from the improved composition made as described above, there may be added thereto conventional volatile solvents and/or plasticizers (substantially non-volatile colloiding agents) for the cellulose acetate. These may be mixed into the composition in a usual type of mixer. However, an important difference is observed in the improved composition, as compared to the previously used cellulose acetate not precipitated upon diatomaceous earth, in the readiness with which the improved composition may be milled prior to, at the time of, or after the incorporation of the plasticizers and/or solvents, as well as in the readiness with which the said plasticizers or solvents added penetrate the composition. While this invention is limited to no theory of explanation of the results obtained, the following observations are of interest. At the time of the precipitation, diatomaceous earth provides a base upon and in which the precipitate of acetate forms. The base prevents coalescence of the acetate into hard, horny masses and thus facilitates subsequent grinding. In the ground product, the porous diatomaceous earth may provide a wick action, to draw the solvent into the composition. Furthermore, the diatomaceous earth, being itself insoluble in the solvent used, maintains a skeleton structure and prevents collapse of the surface portions, with subsequent closing of the passages to the interior, as would be the case if the diatomaceous earth or equivalent were not present.

I have also found that my improved composition lends itself readily to the making of molding powders containing cellulose acetate as the binding ingredient. In making such powders, the precipitated mixture of acetate and diatomaceous earth, after drying, is subjected to milling, as in a ball mill. In the mill or in a subsequent mixing operation, there is added a suitable liquor or solid plasticizer, say 45 parts by weight of diethyl phthalate, a sulphonamide, or a mixture of two or more plasticizers, to 100 parts of actual acetate. The resulting composition is adapted to be shaped in a die at the usual elevated pressure and temperature and thus unified into a molded product of desirable properties, with a homogeneity that is not obtained if the commercial cellulose acetate is used, unless the much more elaborate, long, and expensive wet process, using large amounts of solvent, is substituted for the above described simple process.

It will be understood that conventional coloring materials, as, for example, zinc oxide, titanium oxide, and other pigment or dyes, resins, etc. may be added. For making such colored objects, the composition comprising diatomaceous earth as the base for precipitated acetate is preferable to a mechanical mixture of cellulose acetate and opaque fillers, such as talc or gypsum, in that the brightness and translucency of the finished colored objects containing diatomaceous earth are not seriously affected adversely by the diatomaceous earth.

The present invention as applied to the making of an opaque molding powder, simply by precipitating the acetate upon diatomaceous earth, purifying the resulting mass in the conventional way, adding colloiding agent thereto, and milling, is quite different from the very expensive and involved process conventionally used for making molding powder. In this latter process, all the numerous steps of making cellulose acetate plastics are followed, including colloiding with plasticizer and volatile solvent, kneading, filtering to remove extraneous matter, rolling, seasoning to remove volatile solvent, and then crushing and grinding the finished, seasoned plastic.

Products made as described with diatomaceous earth are particularly yieldable and compressible in molding and shaping operations, whereby cracking during such operations is minimized, and are strong, possibly because of the reenforcing action of the porous particles of diatomaceous earth and the homogeneity of structure. The intimacy of the association of the diatomaceous earth and the cellulose acetate is indicated by the fact that, when such a mixture is treated with acetone or a similar solvent to dissolve the cellulose acetate, there is no rapid separation of the diatomaceous earth from the dissolved cellulose acetate. These and other features contribute to the value of the improved composition, not only in the making of the molding powder as specified, but in cellulose acetate to be made into plastics by the conventional wet method, involving colloiding with solvents, rolling, filtering, pressing, sheeting, cutting, and seasoning to remove the excess of volatile solvent.

Other materials than cellulose acetate may be substituted therefor in the improved composition of the present invention. The materials so substituted should be adapted to be precipitated in contact with the diatomaceous earth, to be readily purified and dried in association with the diatomaceous earth, to give with solvents and/or plasticizers a finished composition adapted to be molded or shaped by pressure at an elevated temperature, to have an index of refraction for light that is approximately the same as that of diatomaceous earth, or as many of the above properties as may be desirable in the composition which it is intended to make.

The terms "porous" and "pores" as used herein in connection with diatomaceous earth refer to voids therein, whether the voids actually extend through the individual particles of diatomaceous earth or constitute spaces defined between adjacent particles or between irregularities on the exterior surfaces thereof.

The details that have been given are for the purpose of illustration and not restriction. Many variations therefrom may be made within the scope of the appended claims.

What I claim is:

1. A composition of matter comprising finely divided diatomaceous earth and cellulose acetate intimately associated with and impregnated into the pores of the diatomaceous earth by precipitation in contact therewith and being in an uncolloided condition.

2. A composition of matter comprising finely divided diatomaceous earth that has been calcined, in comminuted form, in the presence of a chemical adapted to flux clay, and cellulose acetate intimately associated with and impregnated into the pores of the diatomaceous earth by precipitation in contact therewith and being in an uncolloided condition.

3. A composition of matter comprising finely divided diatomaceous earth, and cellulose acetate intimately associated with the diatomaceous earth by precipitation in contact therewith, the proportion being approximately 40 to 120 parts by weight of the diatomaceous earth to 100 parts of cellulose acetate.

4. A molding powder, adapted to be shaped and unified by compression in a mold at an elevated temperature and pressure, comprising cellulose acetate, a plasticizer therefor, and finally divided diatomaceous earth, the said cellulose acetate being previously and intimately associated with the diatomaceous earth by precipitation in contact therewith.

5. A composition of matter comprising finely divided diatomaceous earth and cellulose acetate intimately associated with the diatomaceous earth by precipitation in contact therewith, the diatomaceous earth being in the form of particles of such size that at least one-half by weight of the particles are smaller than approximately 4 microns.

6. A composition of matter comprising finely divided diatomaceous earth that has been calcined, in comminuted form, in the presence of a chemical adapted to flux clay, and cellulose acetate intimately associated with the diatomaceous earth by precipitation in contact therewith, the diatomaceous earth being in the form of particles of such size that approximately half by weight of the particles are not larger than 2 microns.

7. A composition of matter comprising finely divided diatomaceous earth that has been calcined, in comminuted form, and cellulose acetate intimately associated with the diatomaceous earth by precipitation in contact therewith, the diatomaceous earth being in the form of particles of such size that practically all of the diatomaceous earth is adapted to be passed through a 150-mesh screen.

8. In forming a composition adapted to be readily ground and penetrated by a solvent, the method which comprises providing cellulose acetate in solution in a solvent, precipitating the acetate in uncolloided form from the said solution by intermixing therewith a suspension of finely divided diatomaceous earth in a liquid non-solvent for cellulose acetate, and then removing the said solvent and non-solvent, to form an intimate mixture including precipitated cellulose acetate and diatomaceous earth.

9. In forming a composition adapted to be readily ground and penetrated by a solvent, the method which comprises providing cellulose acetate in solution in a solvent, precipitating the acetate in uncolloided form from the said solution by intermixing therewith a suspension of finely divided diatomaceous earth in water, and then removing the said solvent and water, to form an intimate mixture including precipitated cellulose acetate and diatomaceous earth.

10. In forming a composition adapted to be readily ground and penetrated by a solvent for a major ingredient thereof, the method which comprises providing cellulose acetate in solution in a solvent, adding finely divided diatomaceous earth and dispersing it in the said solution, adding a liquid non-solvent for cellulose acetate to the resulting mixture, to cause precipitation of the cellulose acetate in uncolloided form, and then removing the said solvent and non-solvent, to form an intimate mixture including precipitated cellulose acetate and diatomaceous earth.

11. In forming a composition adapted to be readily ground and penetrated by a solvent for a major ingredient thereof, the method which comprises providing cellulose acetate in solution in a solvent substantially free from water-insoluble solvent material, adding finely divided diatomaceous earth and dispersing it in the said solution, adding water to the resulting mixture, to cause precipitation of the cellulose acetate in uncolloided form, and then removing the said solvent and water, to form an intimate mixture including precipitated cellulose acetate and diatomaceous earth.

MANUEL R. XIMENEZ.